United States Patent [19]

Watts

[11] Patent Number: 5,668,861

[45] Date of Patent: Sep. 16, 1997

[54] TELECOMMUNICATIONS SYSTEM WITH NOTIFICATION HOLD

[75] Inventor: Ronald F. Watts, Denton, Tex.

[73] Assignee: GTE Laboratories Incorporated, Waltham, Mass.

[21] Appl. No.: 173,385

[22] Filed: Dec. 23, 1993

[51] Int. Cl.$^6$ .................................................. H04M 3/50
[52] U.S. Cl. ........................................ 379/201; 379/208
[58] Field of Search ............................. 379/67, 88, 89, 379/208, 209

[56] References Cited

U.S. PATENT DOCUMENTS

| | | | |
|---|---|---|---|
| 4,723,273 | 2/1988 | Diesel | 379/211 |
| 4,899,358 | 2/1990 | Blakley | 379/215 |
| 4,922,490 | 5/1990 | Blakley | 379/215 |
| 4,930,152 | 5/1990 | Miller | 379/214 |
| 4,947,421 | 8/1990 | Toy | 379/67 |
| 5,007,076 | 4/1991 | Blakley | 379/215 |
| 5,034,975 | 7/1991 | Grimes | 379/67 |
| 5,127,047 | 6/1992 | Bell | 379/100 |
| 5,185,782 | 2/1993 | Srinivasan | 379/67 |

*Primary Examiner*—Dwayne Bost
*Assistant Examiner*—Thomas F. Presson
*Attorney, Agent, or Firm*—Leonard C. Suchyta

[57] ABSTRACT

Apparatus and a method of implementing a notification and hold service in a telephone network is disclosed. A calling telecommunications device is placed on hold by the called telecommunications device, and signals an auxiliary computer system through a network switch that the calling telecommunications device is to be disconnected from the called telecommunications device. The calling telecommunications device is notified at a later time that the called telecommunications device is no longer on hold. In another embodiment of the invention, the calling telecommunications device is connected to customer premise equipment which notifies that calling telecommunications device that the called telecommunications device is no longer on hold.

4 Claims, 3 Drawing Sheets

TELECOMMUNICATIONS SYSTEM WITH NOTIFICATION HOLD

FIELD OF THE INVENTION

The current invention relates generally to telephone systems implementing a hold capability when the called party is not available, and more particularly to telephone systems implementing a notification to the caller on hold when the called party becomes available.

BACKGROUND OF THE INVENTION

Telephone callers often encounter a situation in which the called party is not presently available and are put on hold until the party becomes free to take the call. The caller, during this time, is thus prevented from making other calls or doing other tasks.

If the waiting party engages normal call hold, there is no means of notifying him when the called party is available, and the caller typically abandons or drops the call.

It is thus desirable to implement a Notification Hold capability which restores the caller's telephone to normal status for use while the held call is being monitored for availability of the called party.

OBJECTS OF THE INVENTION

Accordingly, it is a primary object of this invention to obviate the above noted and other disadvantages of the prior art.

It is a further object of the invention to provide a notification and hold capability within the public telephone switching network when a called party is unavailable to accept a call.

It is a yet further object of the invention to provide a notification and hold capability using customer premise equipment when a called party is unavailable to accept a call.

It is a still further object of the invention to provide a notification and hold capability within the public telephone network when a called party is unavailable to accept a call, allowing the calling party to perform another telephone call while the initial call is still on hold.

SUMMARY OF THE INVENTION

Upon completion of a telephone call to one who is not currently available, it is common for the caller to be placed on hold. The caller has perhaps been manually placed on hold, or queued automatically for assistance. In accordance with one aspect of the instant invention, the calling party initiates a request to the telephone network to monitor the availability of the called party. During this period of monitoring, the caller is disconnected from the call and is free to make other calls or perform other tasks. When the called party becomes available, the monitoring device notifies the caller. If the caller's phone is on hook, the system sends a special ring or other notification to the caller's telephone. In the event that the caller's phone is off hook, the system sends a special call waiting tone or other notification to the served party and optionally plays a recorded message. The system described herein is implementable in switch equipment in the telephone network, an "intelligent network" consisting of telephone network switches working in conjunction with general purpose computer processors, user equipment outside the telephone network which are known as "Customer Premise Equipment" (CPE), or a combination of these alternatives.

In another aspect of the invention an auxiliary computer, a general purpose computer system, is coupled to an electronic switching system which together are responsive to a caller's identification and the allowed telephone services for that individual caller. An intelligent peripheral which contains a voice announcement capability and request signaling recognition is coupled to the auxiliary computer system. When a caller connects to an unavailable party, the caller requests the notification and hold service by signaling the auxiliary computer through such means as a switch hook flash or service access code. The auxiliary computer, receiving the request from the network switch, causes the switching system to disconnect the caller from the completed connection and provides for a recorded message to be delivered from the intelligent peripheral to the called party. Detecting the announcement, the called party signals the intelligent peripheral that the held call may now be reconnected by the switching system. If the caller's phone is on hook, a distinctive ring notifying the caller of the called party's availability is applied to the line and a ringback tone returned to the other party. Otherwise, a special call waiting tone is sent to the caller and again a ringback tone is returned to the other party. Upon the caller answering the callback, conversation may begin.

DETAILED DESCRIPTION OF THE PREFERRED EMBODIMENTS

Figure 1:
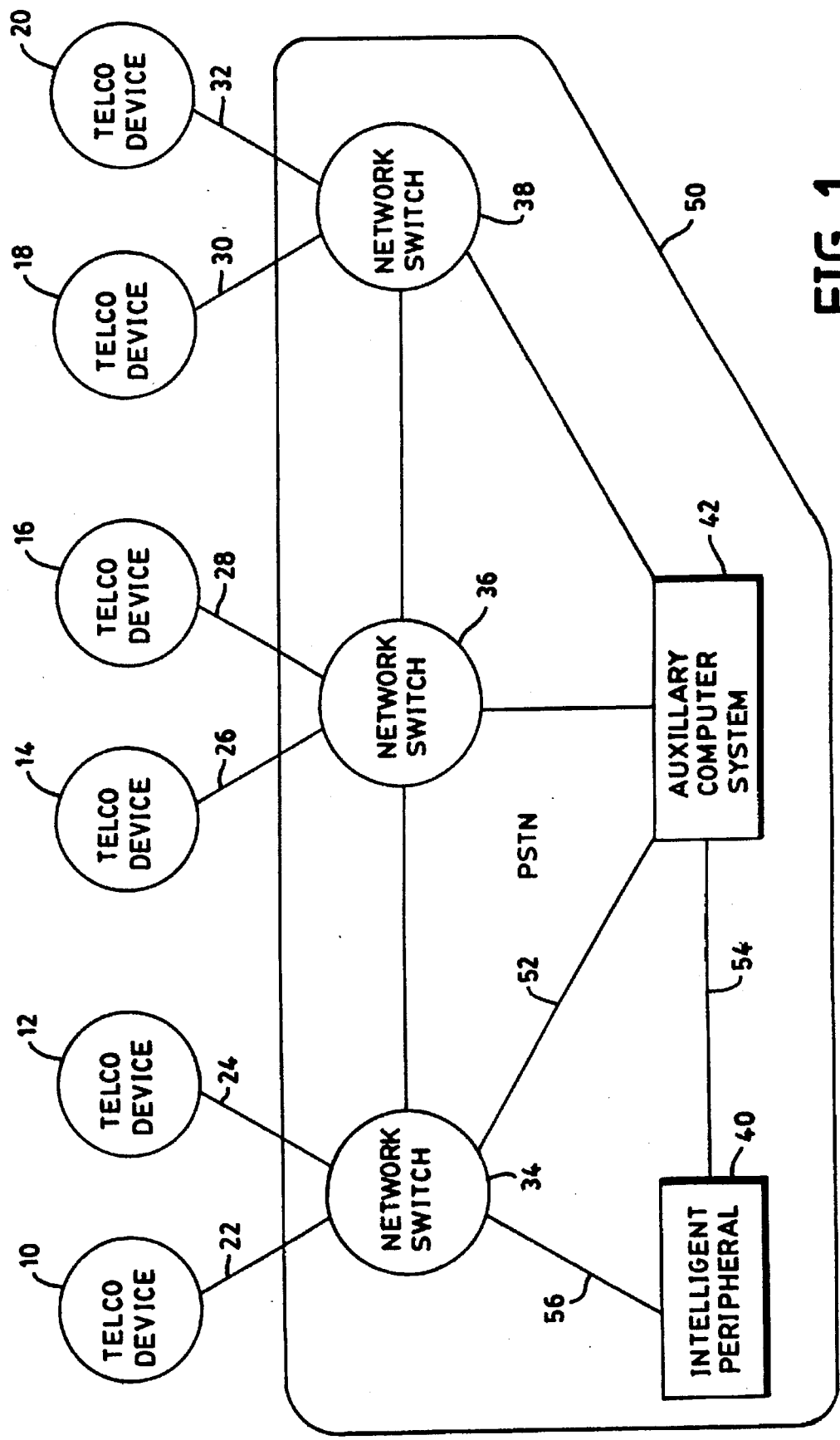
FIG. 1 is an illustration of a telephone network based implementation of a notification hold functionality in accordance with the instant invention.

Referring now to FIG. 1, wherein is shown one embodiment of the communications environment in which the current invention operates. A number of telecommunication devices 10, 12, 14, 16, 18, and 20 are connected by communication lines 22, 24, 26, 28, 30, and 32 to the public switched telephone network (PSTN) 50. Telecommunication devices 10, 12, 14, 16, 18, and 20 may be standard telephone hand sets, facsimile machines, or other communication devices that are well known in the art. Communication lines 22, 24, 26, 28, 30, and 32 may be wire connections such as a standard twisted-pair copper line or fiber optic link. It is pointed out that six (6) telecommunication devices are shown for convenience and exemplary purposes only, and that one will readily recognize that this disclosure is not limited to six devices or communications lines. The public switched telephone network 50 (PSTN) includes a number of switching units 34, 36, and 38 for routing calls through the network. Again, the number of network switches is for exemplary purposes only. Each of the network switches are coupled to an auxiliary computer system 42, providing a computer processing capability to the switch. The auxiliary computer system 42 is further connected to an intelligent peripheral processor 40. The intelligent peripheral processor includes a voice announcement capability, tone dial registers, and a processing unit.

Continuing with reference to FIG. 1, the operation of the notification hold functionality is now described with telecommunications devices 12 and 18 used for example A calling party using telecommunications device 12 dials telecommunications device 18, attempting to communicate with the called party. While the calling and called parties are shown in FIG. 1 to reside on different network switches, it is also possible for both parties to be co-located on the same network switch. At the time of the call from telecommunications device 12, the called party is unavailable to receive the call. This may be due to any number of reasons, including but not limited to: a) the call has been placed on hold or b) the call is terminated on a voice response machine which is patching the call through an agent or c) the distant party has left the telephone momentarily or is otherwise disengaged from the conversation.

In one embodiment of the invention, the calling party initially engages the Notification Hold service by switch hook flash, (i.e. depressing the hook or button which notifies the telephone network switch that the telecommunications device 12 is "on hook"), and dials a service activation code. The switch hook flash indicates to the network switch 34 that service is being requested. Network switch 34 sends the service activation code and callers identification to auxiliary computer 42 which is coupled to network switch 34 by a communication link 52.

Auxiliary computer 42 recognizes the service request and sends instructions back to network switch 34 to disengage the calling party leg of the call associated with the communications link and attach that leg to an intelligent peripheral 40 via a communications link 56.

Voice messaging functionality contained within intelligent peripheral 40 generates a continuous message to telecommunications device 18. This message may for example be "To engage conversation, please press one".

When the called party at telecommunications device 18 is available to engage conversation, the voice message will be heard, and the indicated digit on the telephone keypad to engage the calling party is depressed. The tone register in intelligent peripheral 40 receives the tone and signals auxiliary computer 42 which then queries network switch 34 as to the status of the calling telecommunications device 12. Network switch 34 returns the status of the calling telecommunications device 12 as either active or inactive. Auxiliary computer 42 instructs network switch 34 to proceed as follows:

If calling telecommunications device 12 is inactive, network switch 34 rings telecommunications device 12 with a distinctive ring and disconnects intelligent peripheral 40.

If calling telecommunications device 12 is active network switch 34 sends a distinctive call waiting tone to telecommunications device 12 and disconnects intelligent peripheral 40.

Upon answering the telephone, the calling party begins conversation. Alternatively, the signaling is ignored and, after a timeout period, network switch 34 posts telecommunications device 12 as busy.

Notification Hold can be discontinued by the calling party at any time by lifting the handset and dialing a code for discontinuation. Similarly, the calling party can reattach to the call by dialing a reattach code. Network switch 34 recognizes these codes as special service requests and forwards the request to auxiliary computer 42 via a communications link. Auxiliary computer 42 issues commands to both intelligent peripheral 40 and network switch 48 to reattach the call to the original calling party's line.

If the called telecommunications device 18 disconnects, intelligent peripheral 40 initiates a call to the calling telecommunications device 12 which is notified of the disconnect by playing an announcement such as "Your Notification Hold call has been disconnected. If you wish to re-initiate the call, please press one now". The calling party either confirms the announcement whereupon the call is re-initiated by the intelligent peripheral, or the calling party simply disconnects.

Figure 2:
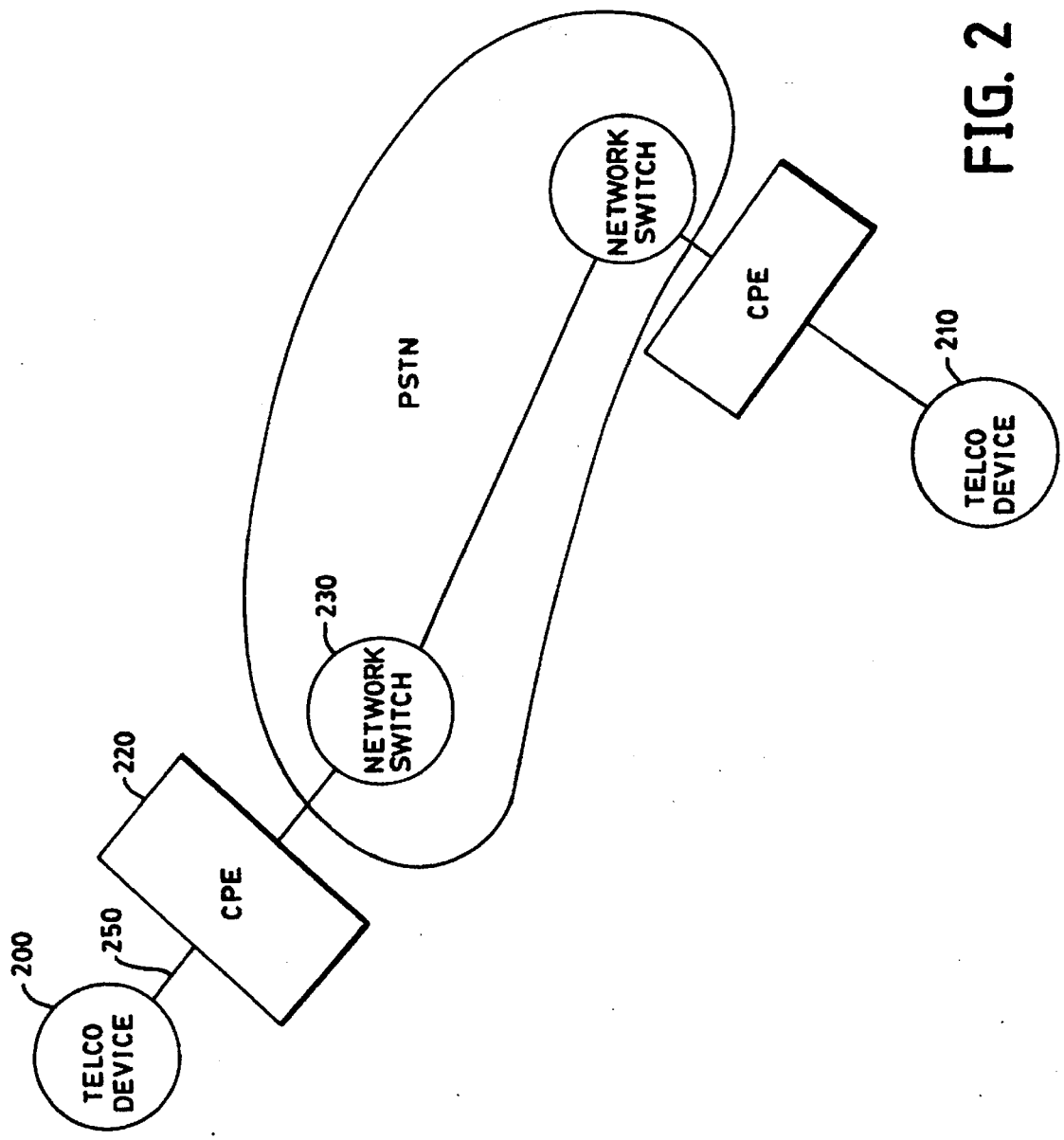
FIG. 2 is an illustration of a CPE (Customer Premise Equipment) based implementation of a notification hold functionality in accordance with the instant invention.
Figure 3:
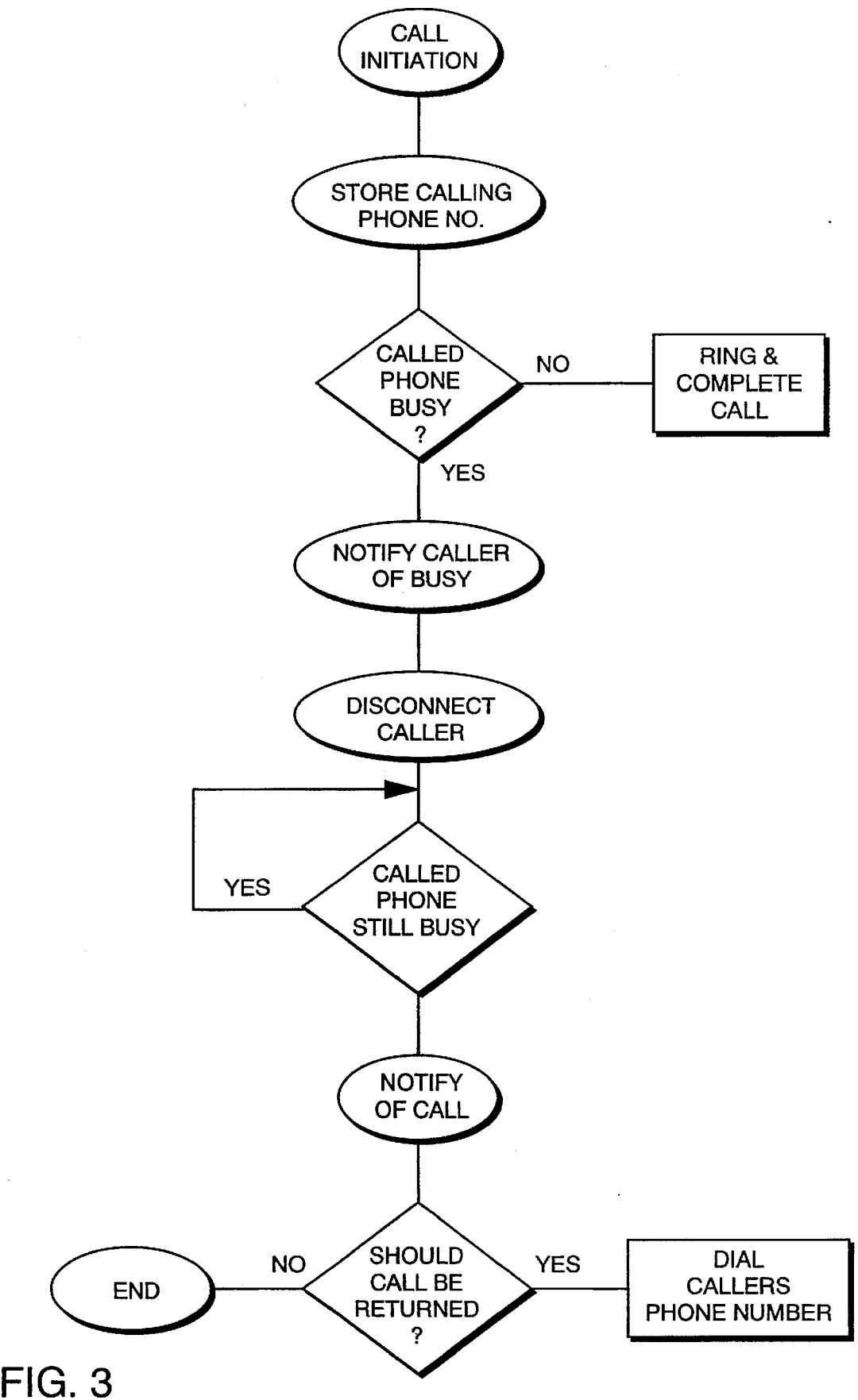
FIG. 3 is a flow chart of the notification procedure according to the instant invention.

Referring now to FIG. 2, another embodiment of the invention is described. A customer premises equipment device CPE device 220 is introduced on the telephone line 250 between the calling party's telecommunications device 200 and the central office network switch 230. CPE device 220 contains a tone dial monitor, announcement circuitry, and ringing circuitry. When attempting to make a call from telecommunications device 200 to telecommunications device 210 and upon finding the caller unavailable the calling party engages Notification Hold Service by dialing a service activation code, when the called party is not available to accept the call. CPE Device 220 responds to the Notification Hold service activation code by placing a hold on the telephone line and initiating a voice message through announcement circuitry included within CPE device 220. The announcement circuitry plays a continuous message to the called party. An exemplary message might be "To engage conversation, please press one".

When the called party becomes available to accept the call, the voice message is heard, and the called party continues the held call by pressing a key on the telephone keypad of telecommunications device 210, causing a tone to be transmitted on the line.

A tone register in CPE device 220 receives the tone and places a ring on the calling party's side of the device. The calling party either answers telecommunications device 200 and begins conversation or ignores the ring and, after a short period of time, CPE device 220 disconnects the call.

Picking up telecommunications device 200 at the calling party's location when the CPE device 220 is engaged, a continuous message is heard. The Notification Hold service can be discontinued at telecommunications device 200 attached to CPE device 220 at any time by lifting the handset and pressing the digit associated with disconnect on the telephone keypad of the telecommunications device 200.

While there has been shown and described what is at present considered the preferred embodiment of the invention it will be obvious to those skilled in the art that various changes and modifications may be made therein without departing from the invention as defined by the appended claims.

What is claimed is:

1. A method of notifying a calling telecommunications device, connected to a network switch, that a called telecommunications device, connected to a network switch, is requesting connection to the calling telecommunications device which has been placed on hold, the method comprising the steps of:

accepting a call by the network switch of said calling telecommunications device;

connecting said call to the network switch of said called telecommunications device and automatically storing at said network switch of said called telecommunications device a calling phone number;

placing on hold by said network switch of said called telecommunications device said call and notifying said calling telecommunications device of the hold;

receiving from said calling telecommunications device a signal to monitor the availability of said called telecommunications device;

disconnecting said calling telecommunications device from said network switch of the calling telecommunications device;

notifying said called telecommunications device that a connection was requested by said calling telecommunications device identified by said automatically stored calling phone number;

receiving at any time from said calling telecommunications device a discontinuation code to discontinue the notifying of the called telecommunications device of said call placed on hold;

reattaching said call after being discontinued by receiving from said calling telecommunications device a reattach code to resume the notifying of said called telecommunications device that a connection was requested by said calling telecommunications device;

receiving from said called telecommunications device a signal to request a connection between said calling and called telecommunications device;

notifying said calling telecommunications device that said called telecommunications device has given a signal to request connection between said calling and called telecommunications device; and said network switch recognizing said codes within a telecommunications system.

2. A telecommunications system for communication on a telecommunications network, said system comprising:

at least one calling telecommunications means for initiating said communication;

at least one called telecommunications means for receiving said communication;

a network switching means, operably connected between said calling telecommunications means and said called telecommunications means, for:

accepting a call from said calling telecommunications means, storing a telephone number from said calling telecommunications means, monitoring said called telecommunications means and if said called telecommunications means is unavailable placing said call on hold, notifying said called telecommunications means that a connection was requested by said calling telecommunications device and notifying said calling telecommunications means of said call being placed on hold, disconnecting said calling telecommunications means, and receiving at any time from said calling telecommunications means a discontinuation code to discontinue said notification to said called telecommunications means of said request for connection;

said network switching means comprises means for receiving from said calling telecommunications means a reattach code to resume said notification to said called telecommunications means of said call on hold, receiving from said called telecommunications means a signal to request connection between said called and said calling telecommunications means, and notifying said calling telecommunications means that said called telecommunications means has given said signal to request said connection; and said network switching means recognizing said codes within said telecommunications system.

3. A telecommunications system as defined in claim 2 wherein said network switching means comprises a network switch and a computer means.

4. A telecommunications system as defined in claim 2 wherein said network switching means comprises a plurality of network switches and a computer means.

* * * * *